(12) United States Patent
Van Der Knaap et al.

(10) Patent No.: US 12,606,008 B2
(45) Date of Patent: Apr. 21, 2026

(54) COOLING SYSTEM FOR FUEL CELL

(71) Applicant: DAF Trucks N.V., Eindhoven (NL)

(72) Inventors: Albertus Clemens Maria Van Der Knaap, Helmond (NL); Bernardus Johannes Maria Weijenborg, Deurne (NL); Rob Adrianus Johannes Van Den Heijkant, Best (NL); Date Willem Egbert Rentema, Eindhoven (NL)

(73) Assignee: DAF Trucks N.V., Eindhoven (NL)

( * ) Notice: Subject to any disclaimer, the term of this patent is extended or adjusted under 35 U.S.C. 154(b) by 693 days.

(21) Appl. No.: 18/010,061

(22) PCT Filed: Jun. 15, 2021

(86) PCT No.: PCT/NL2021/050376
§ 371 (c)(1),
(2) Date: Dec. 13, 2022

(87) PCT Pub. No.: WO2021/256923
PCT Pub. Date: Dec. 23, 2021

(65) Prior Publication Data
US 2023/0226903 A1    Jul. 20, 2023

(30) Foreign Application Priority Data
Jun. 16, 2020    (NL) ..................................... 2025840

(51) Int. Cl.
*B60K 1/04*        (2019.01)
*B60K 11/08*       (2006.01)
(Continued)

(52) U.S. Cl.
CPC .......... *B60K 11/085* (2013.01); *B60K 15/067* (2013.01); *B60K 2015/03315* (2013.01); *B60K 2015/0638* (2013.01); *B62D 35/001* (2013.01)

(58) Field of Classification Search
CPC ...... B60K 1/00; B60K 11/085; B60K 15/067; B60K 2015/03315; B62D 35/001
See application file for complete search history.

(56) References Cited

U.S. PATENT DOCUMENTS 2,396,506 A    3/1946  Harris
3,715,001 A    2/1973  Wilson
(Continued)

FOREIGN PATENT DOCUMENTS

DE    102019130666 A1    5/2020
EP        1544020 A2    6/2005
(Continued)

OTHER PUBLICATIONS

International Search Report and Written Opinion -PCT/NL2021/050376- mailing date Dec. 23, 2021.

*Primary Examiner* — Jason D Shanske
*Assistant Examiner* — James J Triggs
(74) *Attorney, Agent, or Firm* — Banner & Witcoff, Ltd.

(57) ABSTRACT

A truck or tractor semi-trailer combination interconnected via a fifth wheel, comprising a cabin and an air collection chamber, the air collection chamber provided between a rear end of the cabin and the semi-trailer and having a front wall substantially adjacent or identical to a cabin rear wall, and a rear wall distanced and substantially coplanar to the front wall, which air collection chamber is provided with an air accession structure and a heat exchanger, the air accession structure providing air access to the air collection chamber and towards the heat exchanger, said heat exchanger provided in the rear wall of the air collection chamber extending at least partly over a width of the truck and wherein said air accession structure comprises air accession side ports provided on the side walls of the air collection chamber (Continued)

designed to provide at least a passive air flow from the air accession side ports towards the heat exchanger.

20 Claims, 13 Drawing Sheets

(51) Int. Cl.
| | |
|---|---|
| *B60K 15/067* | (2006.01) |
| *B60K 15/03* | (2006.01) |
| *B60K 15/063* | (2006.01) |
| *B62D 35/00* | (2006.01) |

(56)                    References Cited

U.S. PATENT DOCUMENTS

| | | | |
|---|---|---|---|
| 4,362,208 A | 12/1982 | Hauser | |
| 2014/0069972 A1* | 3/2014 | Willemsen | B60K 15/063 |
| | | | 224/401 |
| 2018/0361847 A1* | 12/2018 | Vacca | B60K 11/085 |
| 2022/0371434 A1* | 11/2022 | Andersson | B60K 15/07 |
| 2024/0097156 A1 | 3/2024 | Aslani et al. | |

FOREIGN PATENT DOCUMENTS

| | | | |
|---|---|---|---|
| EP | 2799272 | A1 | 11/2014 |
| EP | 2948330 | B1 | 4/2019 |
| WO | 2020013746 | A1 | 1/2020 |

* cited by examiner

COOLING SYSTEM FOR FUEL CELL

CROSS-REFERENCE TO RELATED APPLICATIONS

This application is a U.S. National Stage application under 35 U.S.C. § 371 of International Application PCT/NL2021/050376 (published as WO 2021/256923 A1), filed Jun. 15, 2021 which claims the benefit of priority to Application NL 2025840, filed Jun. 16, 2020. Benefit of the filing date of these prior applications is hereby claimed. Each of these prior applications is hereby incorporated by reference in its entirety.

BACKGROUND OF THE INVENTION

The invention relates to vehicles with alternative fuel sources, in particular vehicles comprising fuel cells.

Of particular interest are heavy load vehicles such as trucks. Trucks in general are used to transport heavy loads over long distances. Particularly in case of heavy duty long haul applications so-called tractor semi-trailer combinations are used in which the tractor vehicle pulls and partly supports the payload that is packed onto the semi-trailer.

The long travelling distances of these typical long haulage tractor semi-trailer combinations require large amounts of fuel on board of the vehicle. Especially when alternative fuel sources are used such as hydrogen, for fuelling the fuel cells that generate the needed electric power to drive the electric motor based driveline, the ability to carry sufficient quantities of fuel becomes even more important due to the fairly poor volumetric energy density in comparison to conventional fossil fuels (like diesel). To increase the volumetric energy density of these hydrogen based fuels normally gaseous hydrogen is pressurized and put into robust thick walled cylindrical container units that can withstand these high internal pressures. Pressure ranges typically from several bars in cryogenic (partly liquid) conditions, to about 350-700 bar for storage of gaseous hydrogen at room temperature. Furthermore installing sufficient cooling means (relatively more cooling power is needed in comparison to conventional diesel based powertrains) for conditioning the fuel cells at a relatively low operating temperature poses a further packaging challenge in combination with the fairly big sized fuel storage system.

From U.S. Pat. No. 4,362,208 it is known to have one additional heat exchanger located outside the engine compartment and with which an additional blower is associated for providing the remaining cooling power of said system. The exchanger is provided in an air channel on the rear of the cab.

EP2948330 provides a cooling duct behind the cabin by means of an adjustable air deflector provided on the cabin roof.

EP1544020 provides a duct, wherein a heat exchanger is provided. The duct is vertically oriented rear to the cabin. An air flow is guided from top inlet opening to a lower outlet. The duct is flat extending over the width of the cabin. The duct relies on a vertical flow from the top, over the width of the cabin, to the bottom. The heat exchanger is parallel to the rear wall of the cabin and has a duct part that is separated from the heat exchanger and the front part.

EP2799272 shows a heat exchanger of a 'turbulence or convection type' on the rear side of the cabin. Air flaps serve for an enhanced aerodynamic side flow from the cabin to the trailer and prevent air entering from the sides.

In the context of fuel cells, used for on board electrical energy generation as power source for electro-mechanical propulsion of commercial vehicles, a massive amount of heat is generated in the cells. FIG. 1A shows heat generation for a single fuel cell that could amount to realistic values of 75-250 kW for full load conditions (corresponding to a range of 50-150 kW net electric power generation per fuel cell) of a commercial truck, where the graph also shows on a relative position scale how this relates to the operating points of lighter vehicle loads, which are still an order more than the heat rejection in ordinary passenger cars. As an indicative number, current generations of fuel cells produce roughly the same or even substantially more heat than electric output power that is delivered by the fuel cell stack. These typical heat rejection powers range from 100 up to 400 kW dependent on installed total fuel system power, where multiple fuel cells may act together in parallel. As a consequence of this heat generation, the energy efficiency, being the relationship between gross energy content of the flow of hydrogen that is fed to anode of the fuel cell and net electric output power generated in the fuel cell stack, is affected: the higher the electric load, the lower the efficiency will be. This indicative relationship is illustrated in the graph of FIG. 1B. Note that a part of the gross electric power that is generated by fuel cell stack itself is used to support the fuel cell module internal balance of plant with energy (e.g. driving the electric air compressor for supplying compressed oxygen to the cathode of the fuel cell). The significant heat production is mainly caused by two factors, being dissipation of generated electric energy in the fuel cell stack itself due to internal impedances of the stacked fuel cell plates (or cells) and generation of waste heat as a consequence of the chemical reaction between $H_2$ molecules and $O_2$ molecules. The corresponding reduction in entropy, related to the production of $H_2O$, causes this additional heat generation which has an equivalent of $T\Delta S=48.7$ kJ/mol.

As an indicative design target the fuel cell based driveline, in which in most cases a battery pack is needed in addition, needs to provide sufficient electric power to an electric propulsion motor to move 40 tonnes GCW on road inclinations of at least 6% in summer temperatures that can rise up to 40° C. It is for these indicative numbers that solutions need to be found that may effectively cool the fuel cells, and possibly additional systems, where it is in current state of the art cell technology vital that the fuel cell temperature, for efficiency purposes, is kept stable and sufficiently low in order to fulfil the lifetime requirements that are posed to driveline components of commercial vehicles which e.g. may last an operation time equivalent of 1.6 million kilometres of driving distance. Specifically in case of so-called proton-exchange membrane fuel cells, also known as polymer electrolyte membrane (PEM) fuel cells (PEMFC), which are developed and applied mainly for transport applications because of the good trade-off in complexity, costs, performance and robustness, these fuel cells need to be operated at relatively low temperature ranges (typically ranging between 50 to 100° C.). In case that these fuel cells are operated at full load, for instance during uphill driving, the PEM based fuel cell stack needs to be cooled well below 80 degrees Celsius to avoid drying out and initiation of local cracks in the cell membranes which is lethal for ensuring a long lifetime of the fuel cell. Considering the small temperature difference between 80 degrees Celsius inner fuel cell temperature and 40 degrees Celsius ambient temperature, challenging cooling demands are posed to the heat exchanger or heat exchanger system that needs to dissipate heat of the cooling water circuit in terms of sufficient cooling surface and a fairly large volumetric flow rate of cool air to pass through the heat exchanger system. Furthermore depending on the applied cooling liquid differing in its physical heat exchange property, known as specific heat conduction coefficient, the cooling liquid will absorb a specific amount of fuel cell produced heat when it passes through the fuel cells. The more heat is absorbed by the cooling liquid, the more effective the cooling circuit will work. However, this heated up liquid in the return line from fuel cell to the cooling radiator (or heat exchanger) needs to be cooled down by the heat exchanger to an acceptably low inlet temperature of the fuel cell stack to protect the fuel cell against overheating. In summary: at a given cooling water flow rate (generated by a fuel cell system integrated electric pump) and at a given heat production of the fuel cell stack the cooling water temperature will increase from inlet to outlet of the fuel cell stack. Consequently, the higher the electric power production, the higher the heat generation of the fuel cell stack and thus the more the outlet temperature increases when the cooling water passes through the fuel cell stack. FIG. 1A shows that the delta T indeed rises considerably with higher power demand and it is critical that the resulting outlet temperature stays sufficiently low in order to protect the fuel cell. In the context of this, even adding more difficulty, the relative velocity of the traveling wind, used for cooling purposes, will drop when driving uphill at maximum fuel cell load. Effectively in such conditions, realistic speeds of uphill climbing could drop down to about 40 km/h.

A further problem, especially in the European context, is that the available amount of cooling area in the front area of the truck vehicle is limited, with 'cab over engine' type of cabin designs. The reason for this originates from the fact that the driver is placed in front of and close to the windshield with the steering and pedal work directly above the front end radiator/heat exchanger system. Furthermore the typical setup of European cab-over-engine types of cabin provides for a tilting mechanism (for under cab maintenance purposes; accessibility) with a rotation axis that is located under the floor level of the cabin and close to the chassis members. This provides for an additional pitching degree of freedom which is integrated into the roll stabilizer system that connects the cabin to the chassis and consequently consumes further packaging space in the near vicinity of the front end radiator. All these factors compete with the underlying available area/space for installing large heat exchanger systems, which are known to occupy frontal area.

In addition, the available space between the fifth wheel and the back of the cabin is limited due to the maximum length regulation of the tractor and semi-trailer.

It is found that prior art solutions, for these exceptional challenges, only have limited possibilities to generate sufficient cooling power for a heat exchanger, where it is even likely that blowers, installed close to a heat exchanger or radiator placed behind the cabin, instead of taking in fresh air, may recirculate heated air, which is of course totally undesirable.

It is an objective of the claimed invention to solve one or more problems faced in the state of the art with the aim of providing substantial surface of the auxiliary cooling radiators and providing a sufficient amount of flow of cool air towards the heat exchanger system.

SUMMARY OF THE INVENTION

The invention provides for solving or improving at least one of the disadvantages of the prior art by the features of claim 1. In particular a truck or tractor semi-trailer combination that is interconnected via a fifth wheel, comprises a cabin and an air collection chamber, the air collection chamber provided between a rear end of the cabin and the semi-trailer. The air collection chamber has a front wall substantially adjacent or identical to a cabin rear wall, and a rear wall distanced from the front wall. The air collection chamber is provided with an air accession structure and a heat exchanger, and provides air access to the air collection chamber and towards the heat exchanger. The heat exchanger is provided in the rear wall of the air collection chamber extending at least partly over a width of the truck. The air accession structure comprises air accession side ports provided on the side walls of the air collection chamber designed to provide at least a passive air flow from the air accession side ports towards the heat exchanger.

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention.

DETAILED DESCRIPTION

Specifically in case of fuel cell electric vehicles (FCEV's) big cylindrical tanks with compressed hydrogen gas may be be packaged between the cabin rear end and the semi-trailer front end leaving very little space available to install additional auxiliary radiators in this semi-trailer perimeter confined area. This invention aims to place large flat radiators in the middle of the back of the cabin in between two big cylindrical hydrogen tanks that are placed in vertical position at the side corners of the cabin thereby optimally consuming the available packaging space for these crucial FCEV components in the semi-trailer perimeter (see 488 in FIG. 12) confined zone between cabin and semi-trailer.

The radiators may comprise integrated e-fans that provide desired equilibrium between fuel cell heat production and drainage of heat in the cooling water circuit. The e-fans may be activated only when a threshold is passed at the moment that the traveling wind only is no longer sufficient to provide enough cooling to the cooling liquid medium. For this purpose one or more temperature sensors may be installed in the cooling circuit with preferably one of them located directly at the outlet return line of the fuel cell stack where the temperature is the highest. It is stipulated that the general claims of this invention regarding the placement of pressurized fuel vessels are not limited to the application of fuel cell only electric vehicles. The use of hydrogen or natural gas or biogas or ammonia, etc. is also possible as fuel for application in hybrid applications. These applications may have a similar central drivetrain (engine-gearbox-propeller shaft) as a conventional diesel truck. Even a combination of a hydrogen fuelled internal combustion engine and an electrical drivetrain can be considered. For instance in the form of a so-called series hybrid setup wherein the internal combustion engine drives an electric generator that provides the needed electric current to charge the batteries and/or electric motor that drives the wheels. All these vehicles profit from placing almost upstanding elongated pressure vessels behind the cabin using the perimeter defined clearance zone of the semi-trailer to substantially increase the driving range in addition to the spherocylindrical pressure vessels placed left and right of the chassis members and in between the front and rear axle.

Figure 1A:
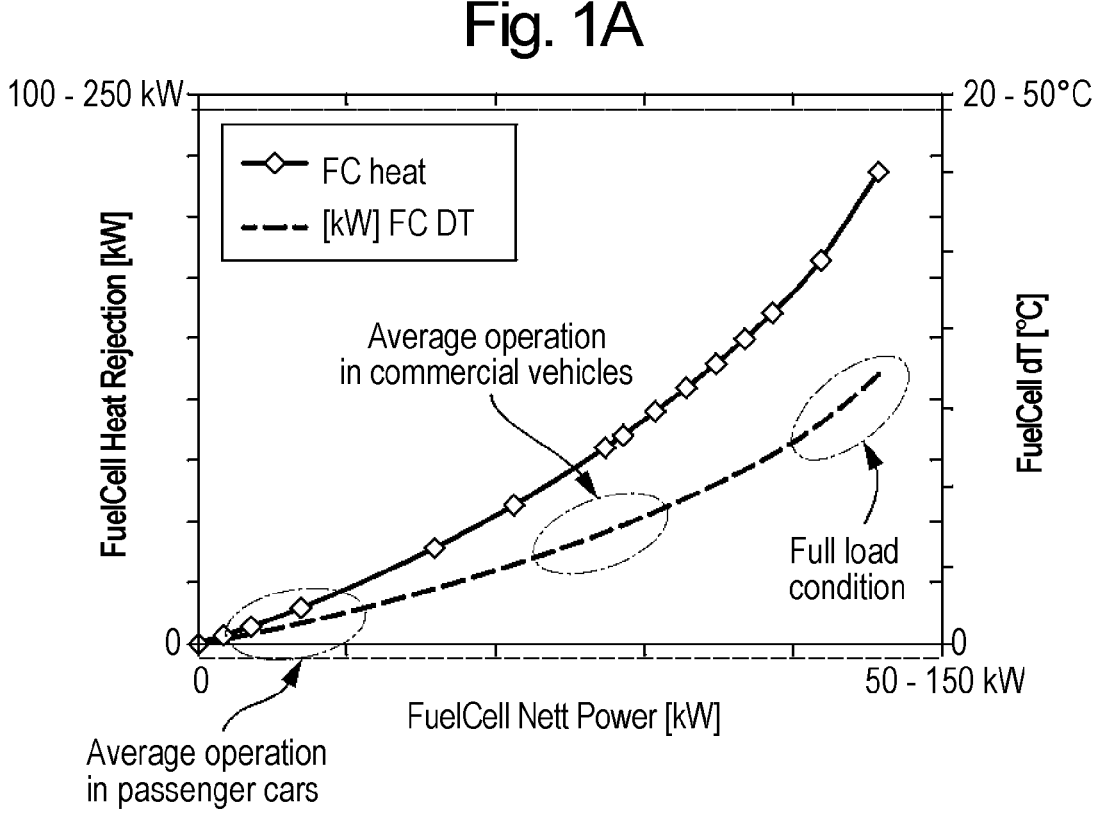
FIG. 1 shows an exemplary graph showing indicative heat production, temperature load and energy efficiency of a conventional 50-150 kW fuel cell.
Figure 1B:
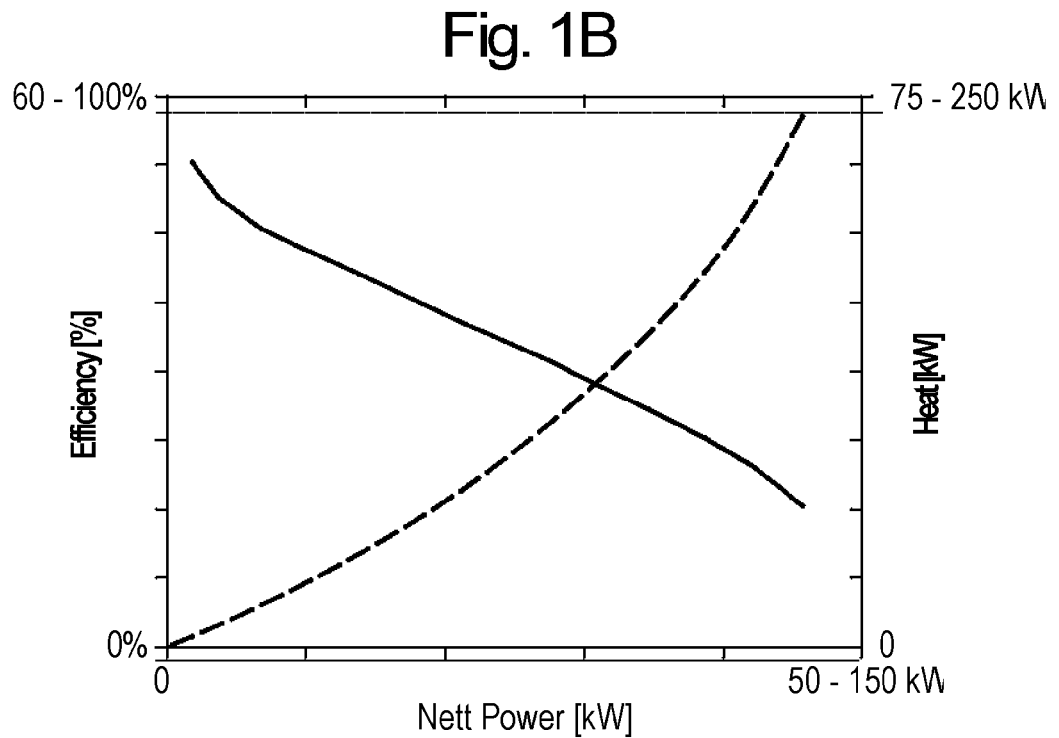
Figure 2:
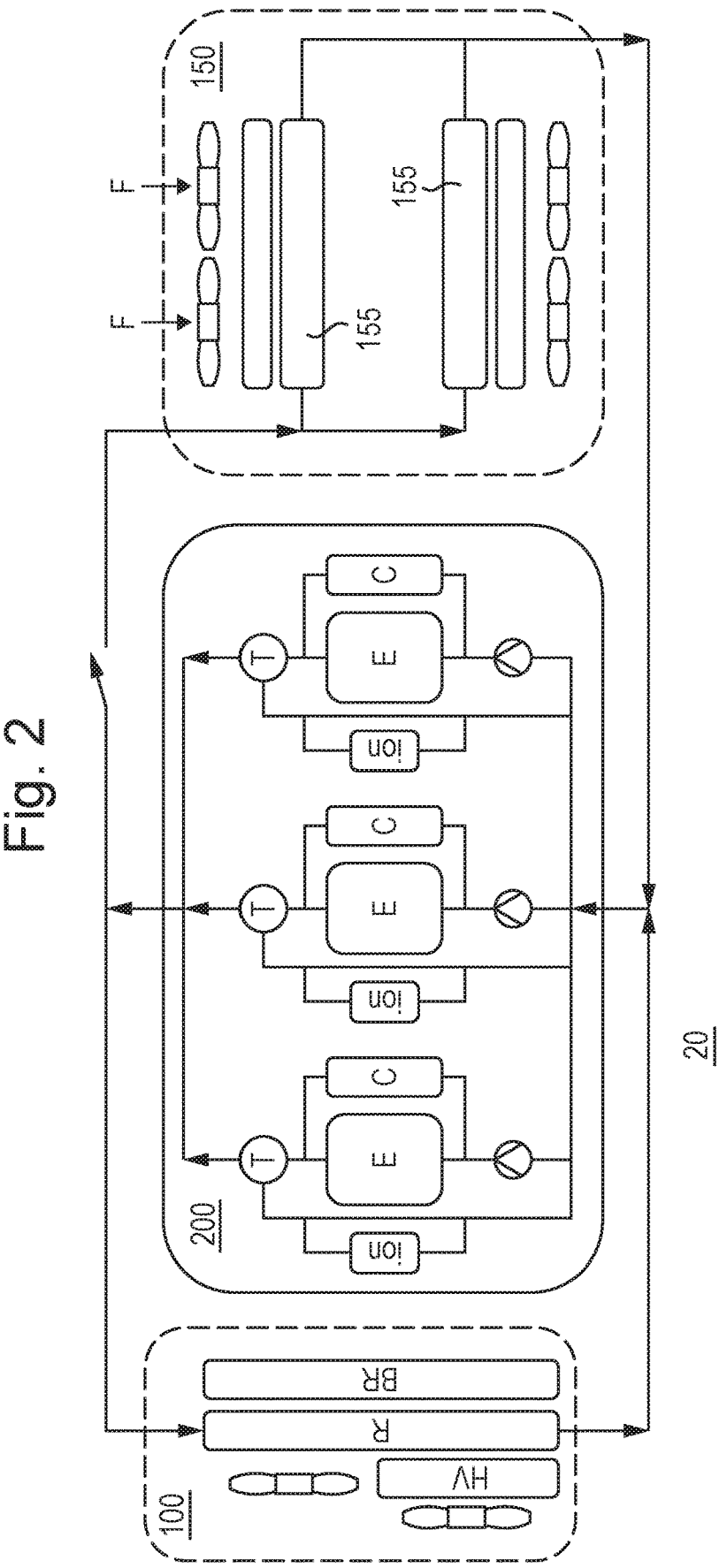
FIG. 2 shows a schematic layout of three combined fuel cell modules having a primary cooling circuit and a further cooling circuit, that can be switched both as a separate or as a connected circuit to the primary cooling circuit.
Figure 3:
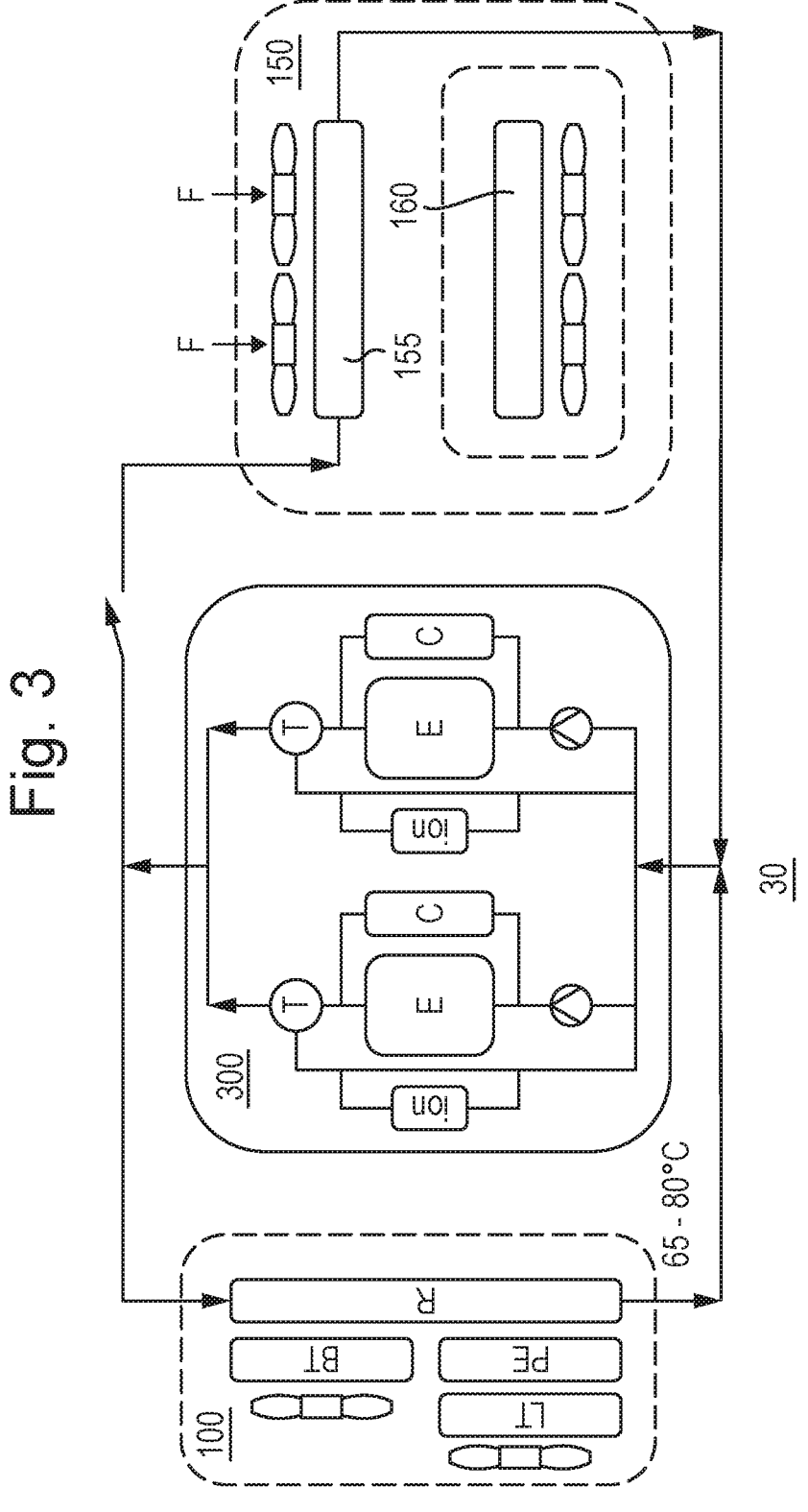
FIG. 3 shows an alternative schematic layout of two connected fuel cell modules.

Turning to FIG. 2 a general layout is illustrated for, in this case, a cooling circuit 20 including a triple configuration of fuel cells 200 switched in parallel. Similarly, in FIG. 3 a double configuration of fuel cells 300 is shown. Parallel switching is not mandatory, but may be beneficial for temperature control. The more fuel cells are applied and switched in parallel, the lower the electrical load per fuel cell and thus the better the efficiency of the total fuel cell system (see right hand diagram in FIG. 1) to deliver the needed power to the driveline of the vehicle will be. Consequently the heat generation can be reduced. The exact working of the fuel cell will not be explained further and is deemed known to the skilled person. In FIGS. 2 and 3 each fuel system is shown to have three individual components in the cooling circuit being an ion exchange component (ION) for protecting the fuel cell stack against excessive ionic changes; a current exchange component (E) which is the actual fuel cell stack itself where the electric current is being generated and a cooling subcircuit (C) for providing cooling water to the intercooler of the air compressor. The latter cools down the hot compressed air that is fed to the cathode of the fuel cell stack: the lower this temperature is, the higher the electrical output performance of the fuel cell stack will be.

As explained before it is important that a fuel cell, in particular of the PEM type is conditioned at a certain operating temperature to avoid drying out and initiation of local crack in the membranes. For economic life expectancy, it is optimal that this temperature is substantially constant, and typically at operating temperatures below 80 degrees Celsius. The cooling circuit 100 is provided with a conventional routing through a front end radiator section or heat exchanger, which may also include a brake resistor radiator circuit, and a further sub circuit for other appliances, e.g. an airco radiator (HVAC). Indicative coolant flows could be in the order of 150-500 l/min, where after radiation, the coolant temperature is in the lower range of 50-80 degrees Celcius.

As part of the inventive concept, FIG. 2 shows an additional rear circuit 150, which could be separate or thermally coupled to the front circuit 100. The rear circuit 150 comprises one or more heat exchangers 155 provided in a rear wall of an air collection chamber, to be further elaborated in the subsequent figures. The heat exchanger(s) may optionally be actively cooled by fans F, that may be coupled to a control circuit that is activated after a predetermined temperature rise is detected in the cool circuit, or another indicator is perceived that triggers active cooling by fans. Indicative coolant flow rates may be in the order of 50-300 l/min per radiator, which could be delivered by one or more water pumps, notably three as depicted in FIG. 2 or two as depicted in FIG. 3. The one or more heat exchangers may be part of a single circuit, or may be part of separated circuits, as depicted in FIG. 3. Notably, the design may be shaped such that in the normal operation of the fuel cell, fans may be inactive, and the cooling is realized by the function and shape of the air collection chamber. Additional to the FIG. 2 setup, FIG. 3 shows that further heat exchanger circuits may be parallel stacked, and may couple to additional cooling circuits. E.g. further cooling circuits may be coupled to the front system 100 or rear system 300, for instance, for cooling power electronics PE, the power battery BT or the brake resistor BR.

Advantageously, a brake resistor circuit in particular, an additional radiator 160 is placed in the rear system 150, as these circuits allow higher temperatures and require a relatively large packaging space which is hard to find in the fully packed front end region of the truck.

Figure 4:
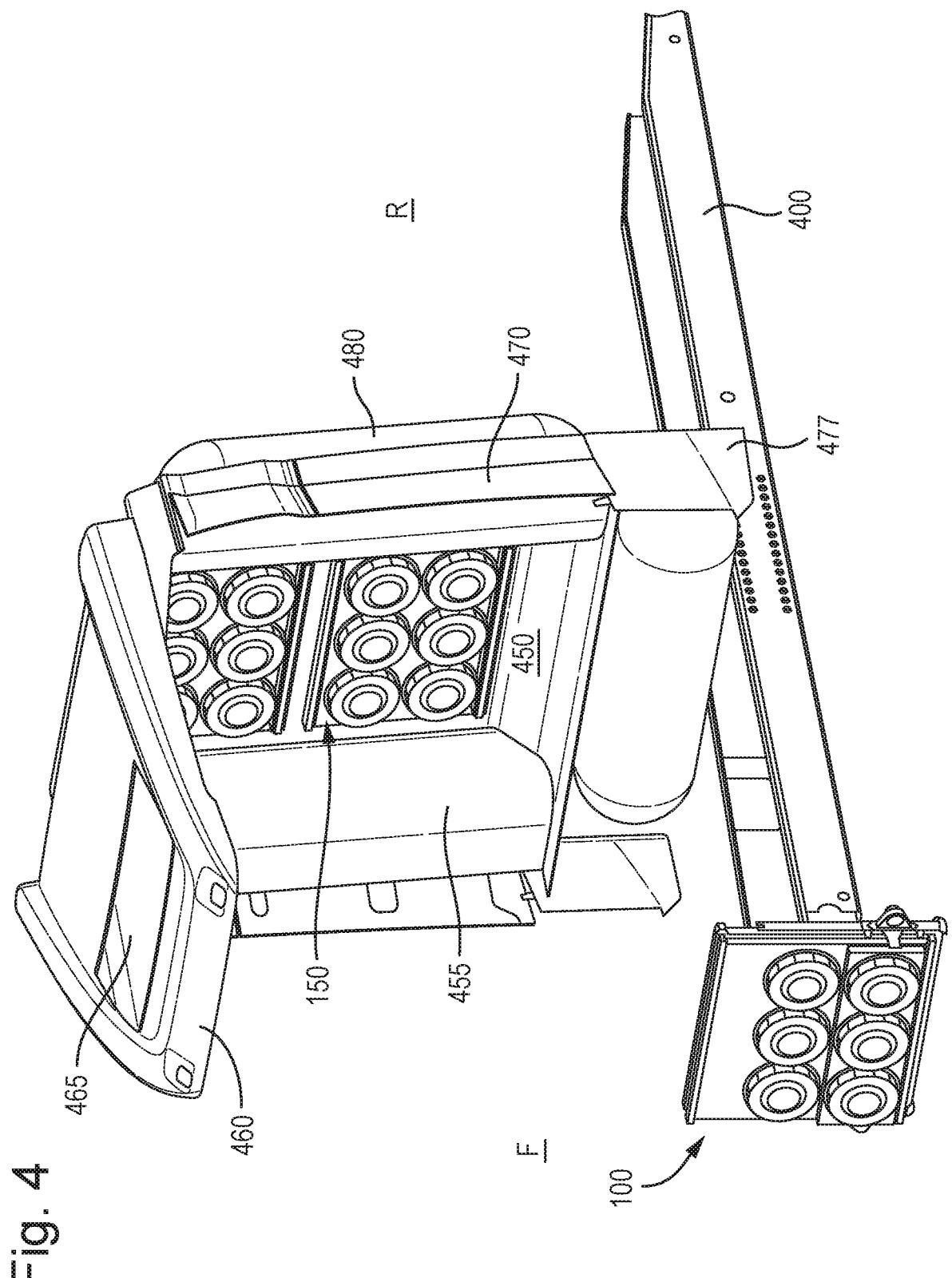
FIG. 4 shows a front perspective top view of an embodiment of the invention with an air collection chamber.

FIG. 4 shows a front perspective top view of an embodiment of the invention with an air collection chamber, i.e. a perspective relative to the truck, of which only indicatively is depicted it's chassis 400. Chassis 400 may be conventional in setup and may further house an electrical driveline and an electric energy storage battery system not depicted. For ease of understanding, the cabin structure is not depicted, to show a front perspective view on rear wall part 455 of the air collection chamber 450 (cowl) that is provided between a rear end wall of the cabin (not depicted) and the semi-trailer in the rear R. The air collection chamber 450 has its front wall 430 (see FIG. 5) formed substantially adjacent or identical to a cabin rear wall 430. The cowl 455 may not be structurally integral to the front wall, for instance, directly mounted on truck chassis 400, disjunct from the cabin.

The rear wall 455 housing the rear heat exchanger 150 is distanced and substantially planar to the front wall. Air collection chamber 450 is further provided with an air accession structure 470 that provides air access to the air collection chamber 450 and towards the heat exchanger 150. As can be further seen, an advantageous but not mandatory setup is to provide the air collection chamber 450 central to upstanding fuel tanks 480 arranged on the sides of the air collection chamber 450 and partly defining a perimeter of the air collection chamber. The air collection chamber 450, in particular, the cowl 455, heat exchanger 150 and fuel tanks 480 may be mounted to the chassis 400 by a single mounting frame.

Figure 5:
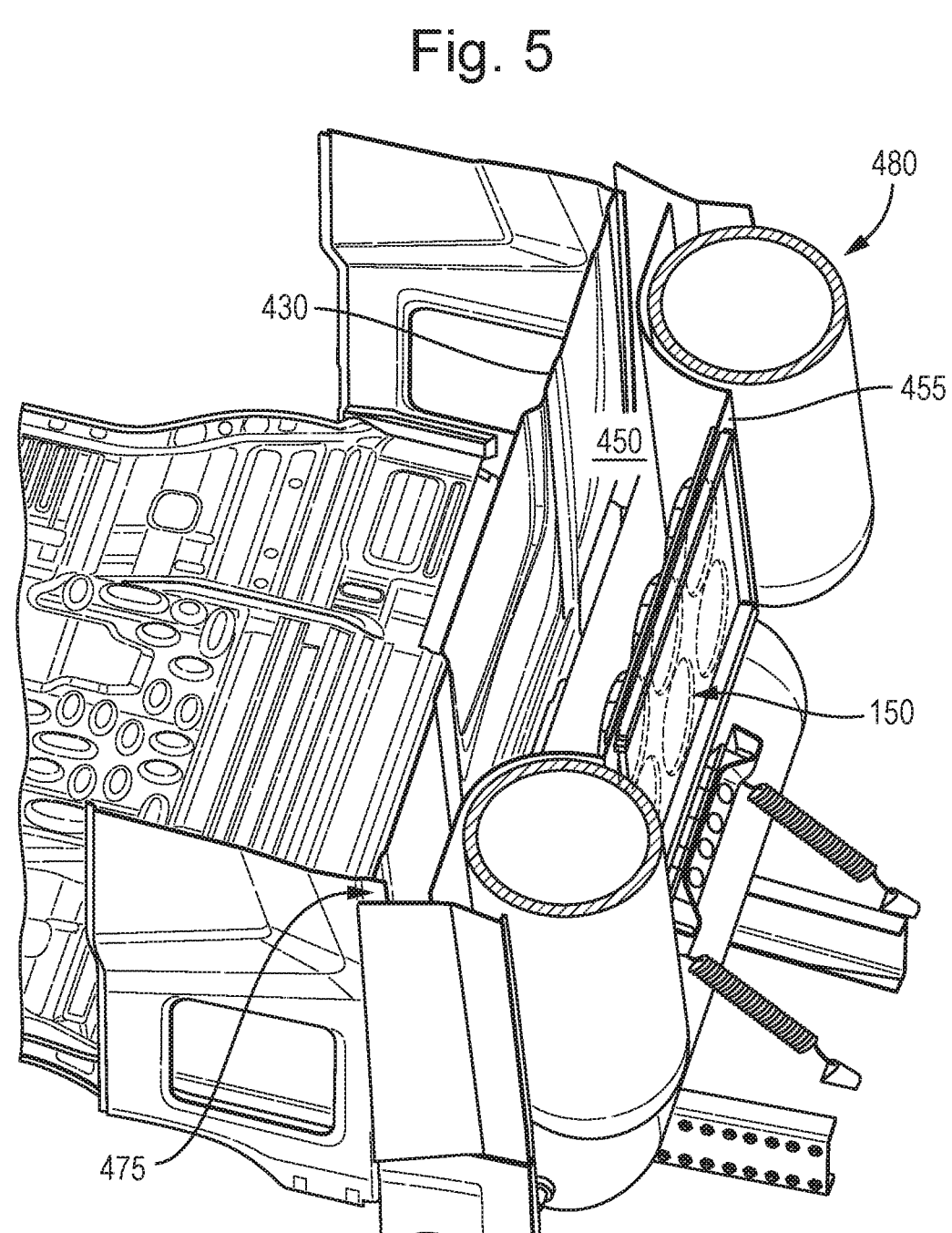
FIG. 5 and FIG. 6 show a rear top and front perspective view of the air collection chamber 450 respectively.
Figure 6:
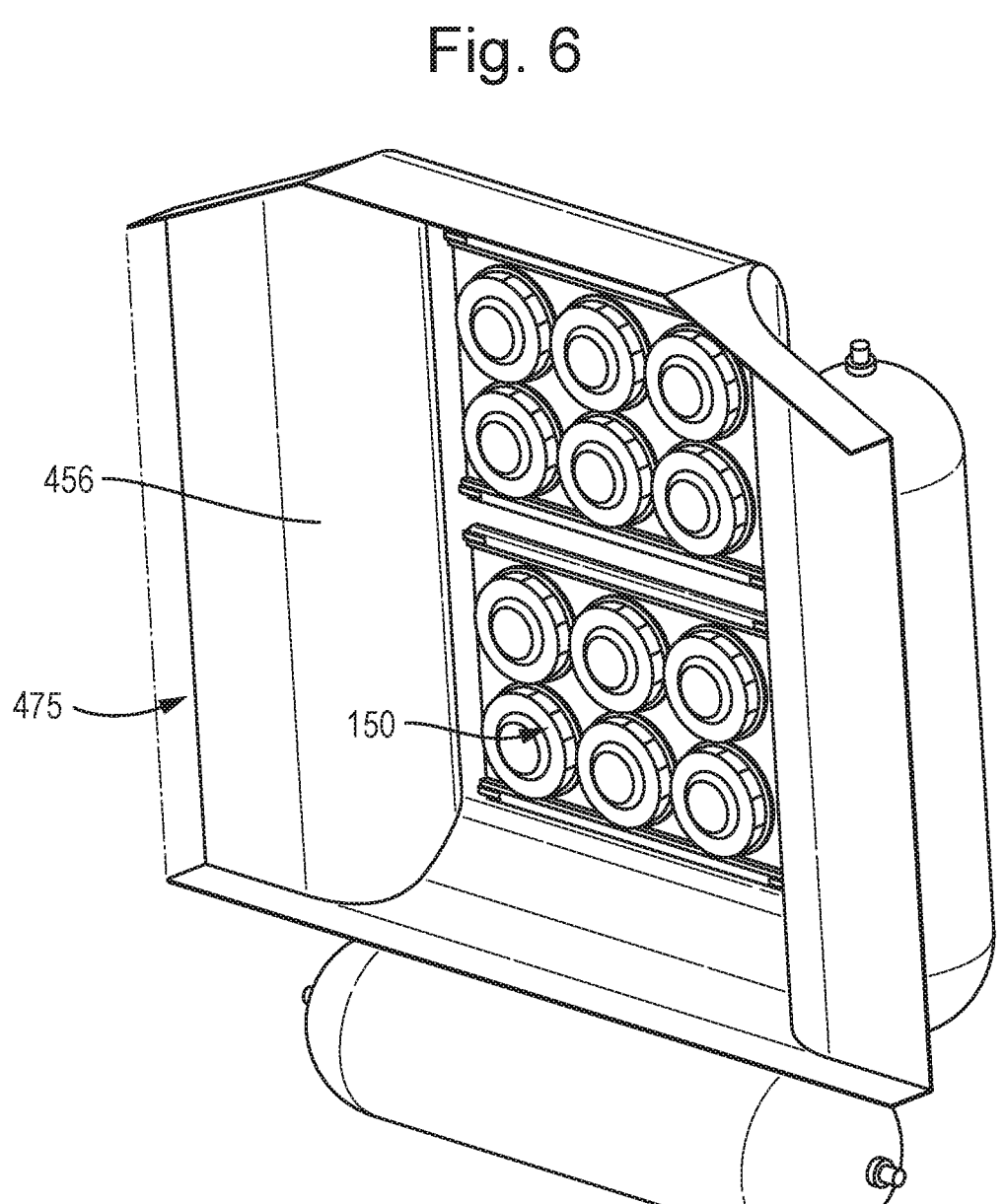

Furthermore, advantageously, the fuel tanks 480 may be oriented with a forward inclination, thereby enlarging a lower gap width of the accession side ports 475 (see also FIGS. 5 and 6 for reference). Illustrative air accession area may range with a sum of accession ports 475 to the air collection chamber have a total cross section ranging between 0.18 and 0.6 m$^2$.

At the same time advantageously, a seal 477 (shown in FIG. 4) which may be construed of a rubber flab, an air cushion or a simple air resistant labyrinth construction closes an entrance path between the chassis mounted cowl 450 and suspended cabin structure at location of a lower portion of the air collection chamber 450 and next to the bottom of the cabin. As a result the seal 477 prevents hot air from the motor compartment entering the air chamber 450. A second lower static side fender 478 is provided as an additional measure to guide travel wind smoothly along the outsides of the vehicle and simultaneously preventing disturbance from hot air that flows underneath the cabin structure such that only a gap of side ports 475 opens at a height substantially, e.g. 50 cm or more above the chassis 400. This additional lower static side fender structure also encapsulates the lower horizontal fuel tank 481 that is placed behind the cabin and underneath the air collection chamber.

The air accession structure 470 may further include a roof channel 460 including an air deflector 465 that opens and closes the roof channel. The latter is important for providing good aerodynamic styling of the cabin roof structure when closed (effectively reducing drag forces) and only opening up when there is a strict need for maximum cooling capacity to control the temperature of the fuel cells (e.g. uphill driving at full load). The roof channel 460 may be located at the top of the cabin and extending substantially towards the front of the cabin. The latter is important for minimizing the risk of recirculation of hot air coming out of the auxiliary radiators at the back of the cabin.

FIGS. 5 and 6 show a rear top and front perspective view of the air collection chamber 450 respectively, as depicted in FIG. 4, from which it can be shown that the fuel tank arrangement 480 results in an air guiding structure 456 provided in the air chamber 450/cowl 455 to guide the air incoming from the air accession side ports along the perimeter towards the heat exchanger 150. The heat exchanger 150 extends along the width of the truck and has air accession side ports 475 provided on the side walls of the air collection chamber 450 designed to provide at least a passive air flow from the air accession side ports 475 towards the heat exchanger 150.

Figure 7:
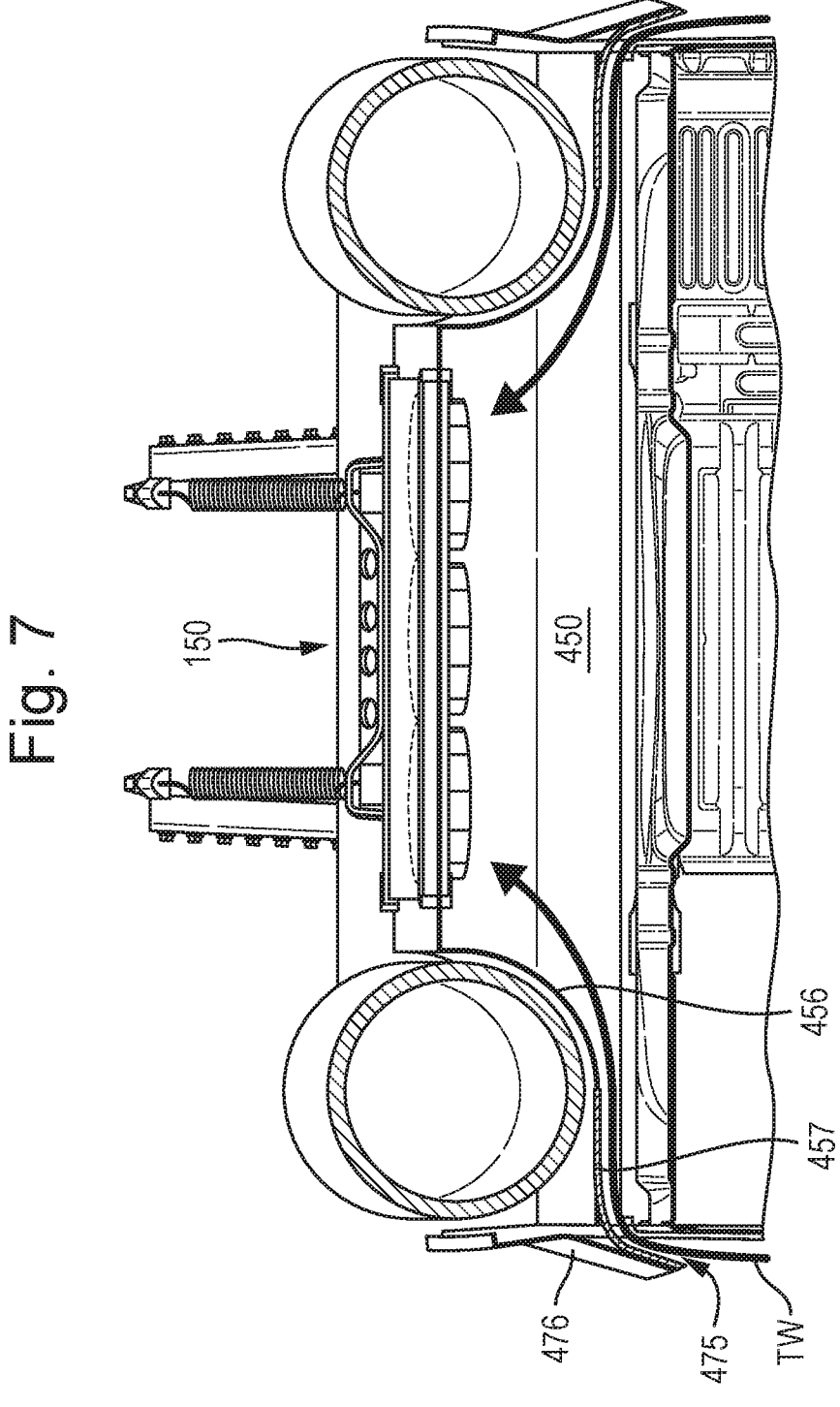
FIG. 7 shows a further exemplary top view of the air collection chamber.

FIG. 7 shows a further exemplary top view of the air collection chamber 450 with an indicative flow via air guides 457 and air accession side ports 475. In the shown embodiment, as can also be gleaned from FIG. 9, the air accession side ports 475 comprise elongated fenders 476 that are actuatable from a closed position, sealing the air collection chamber 450, to an open position wherein the fender 476 is opened e.g. via a hinge mechanism, e.g. a line hinge, to define an angle of attack relative to the travel wind TW passing by the cabin.

Air guiding structure 456 may further comprise flaps 457 that conform with the actuable fenders 476 that further define an air flow path towards 150. Due to legal limit constraints, the room for actuating the fenders 476 is very small, the elongated fender is e.g. tilted outwards over a lateral distance limited to 12 cm or only 8 cm. Surprisingly, this appears sufficient to allow sufficient cooling air to enter the cooling chamber sideways. Although in the example of FIG. 4, air collection chamber 450 is provided with a roof channel 460 some truck designs do not allow this and it is found that air accession from the side ports 475 only is sufficient for directing indicative flows of about 3-5 m3/s through a sum of accession ports to the air collection chamber with a total cross section ranging between 0.18 and 0.6 m².

Figure 8:
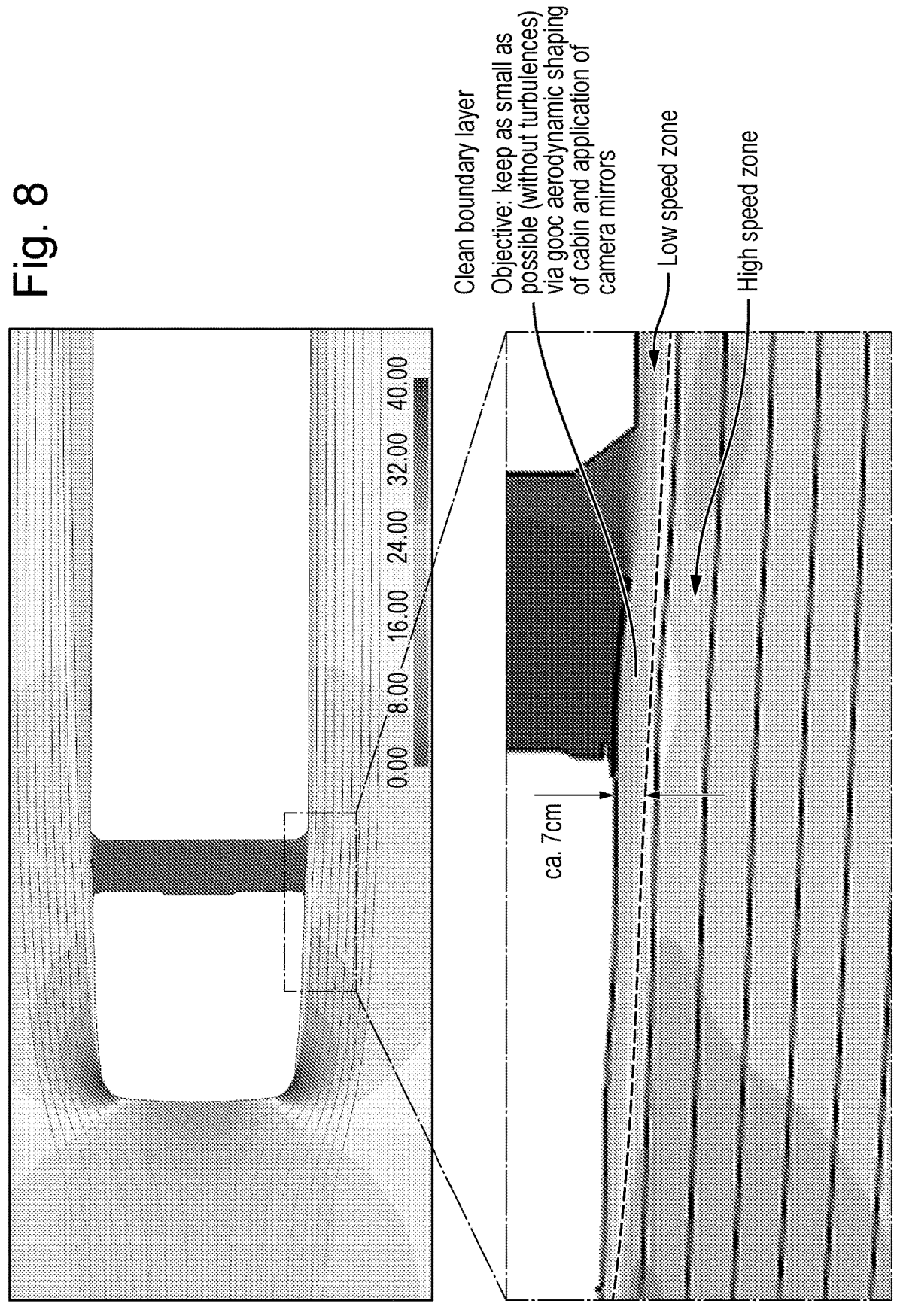
FIG. 8 shows a preferential embodiment of a cabin having a smooth air flow of travel wind FIGS. 9 (A and B) shows a frontal side view of a rear part of cabin with an adjustable air side intake.

FIG. 8 shows a preferential embodiment of a cabin having a smooth air flow of travel wind at close side distance of the cabin. It is found that the air collection of air into side ports 475 increases with a clean boundary layer where turbulent flow is minimized. The objective is to keep this layer as small as possible (without turbulences). This can be achieved by efficient modelling of the cabin via aerodynamic styling of the cabin structure with smooth large radius curvatures near the A-pillar region and application so-called camera monitoring systems as replacement for conventional backview mirrors that are known to have a fairly large frontal surface disturbing the airflow around the cabin. These turbulences can be even further reduced in the vicinity of the air accession ports 475 by sealing off air that could re-enter from below the chassis which is taken care of by application of seal 477 and static lower fender 478 (see FIG. 4) as previously explained. As a result, preferably, the air speed that attacks the fenders 476 increases to about the driving velocity. In the Figure, an exemplary flow has a boundary layer of about 7 cm where the air speed is relatively low. Preferably, the opening of the fenders 476 is just into the high speed zone; without surpassing the legal limits; which in practice is a range of about 5-9 cm laterally away from the cabin sides.

Figures 9A, 9B:
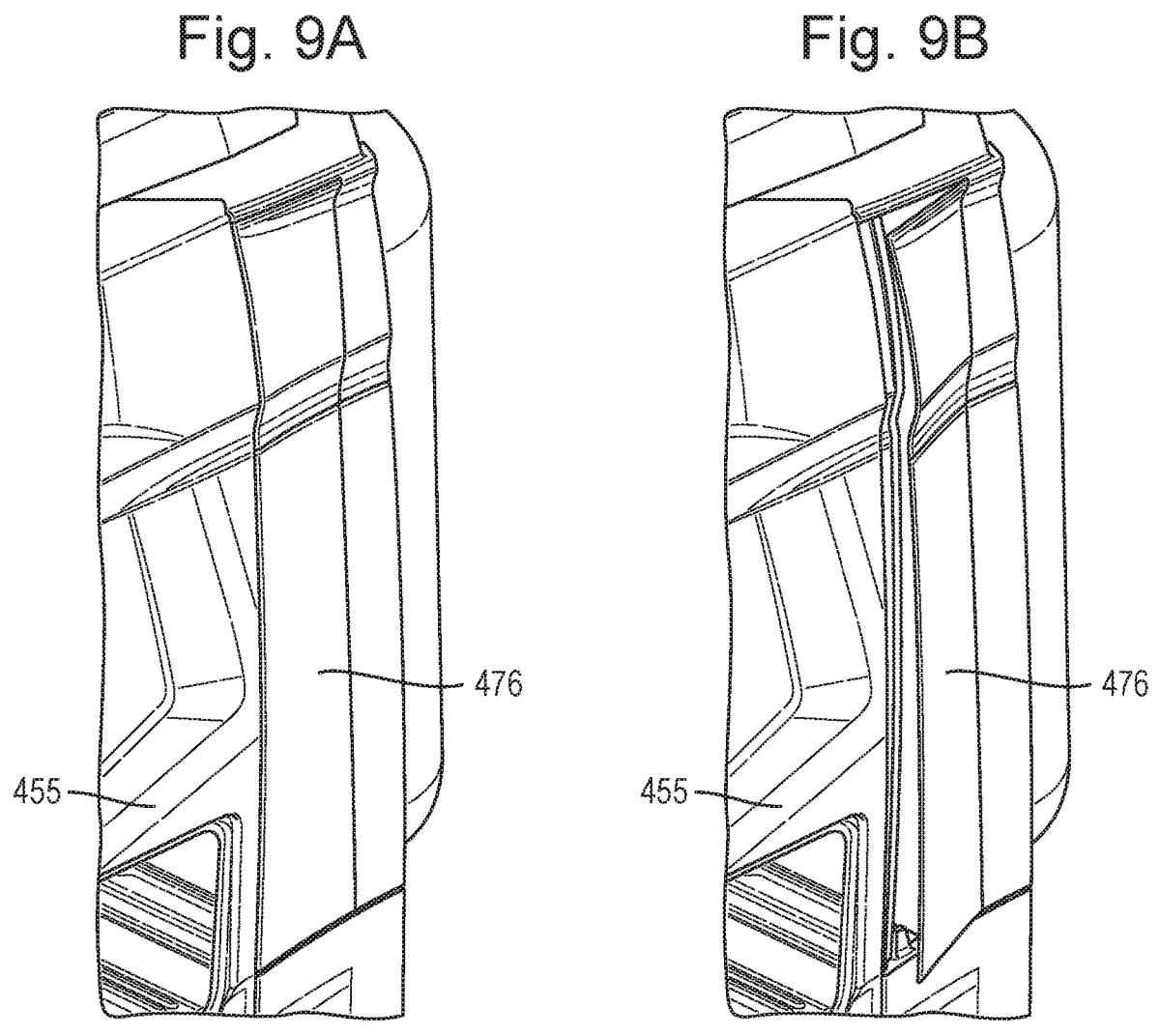

FIG. 9 shows a frontal side view of a rear part of cabin 440 and side fenders 476, with fenders that are actuatable from a closed position (A), sealing the air collection chamber, to an open position (B) wherein the fender is opened to define an angle of attack relative to the travel wind passing by the cabin. It is shown that the angle of attack may vary with height of the fender, in the depicted embodiment, the side fender is slightly more opened in the lower parts. In the depicted embodiment, furthermore, in open position the elongated fender 476 is tilted outwards over a lateral distance limited to 8 cm. The actuation of the fender 476 can be done by several straightforward mechanisms, such as being actuatable over a hinge line segment (substantially vertically elongated and aligned with the tilted orientation of the upstanding cylindrical tanks at the outer sides at the back of the cabin) or alternatively over a rail guidance system.

The elongated fender may be alternatively be supported by the truck cabin.

In closed position the fender 467 is shaped such that is helps to reduce the aero-dynamic drag forces acting on the tractor semi-trailer combination by guiding the air flow smoothly along the gap between cabin and semi-trailer as depicted in FIG. 8.

Figure 10A:
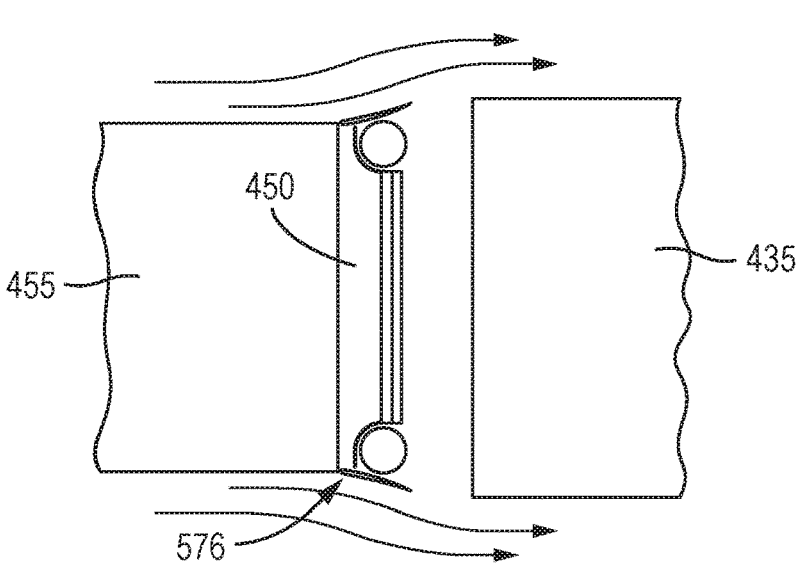
FIGS. 10 (A and B) shows an alternative side intake having a side fender in the form of an adjustable spoiler.
Figure 10B:
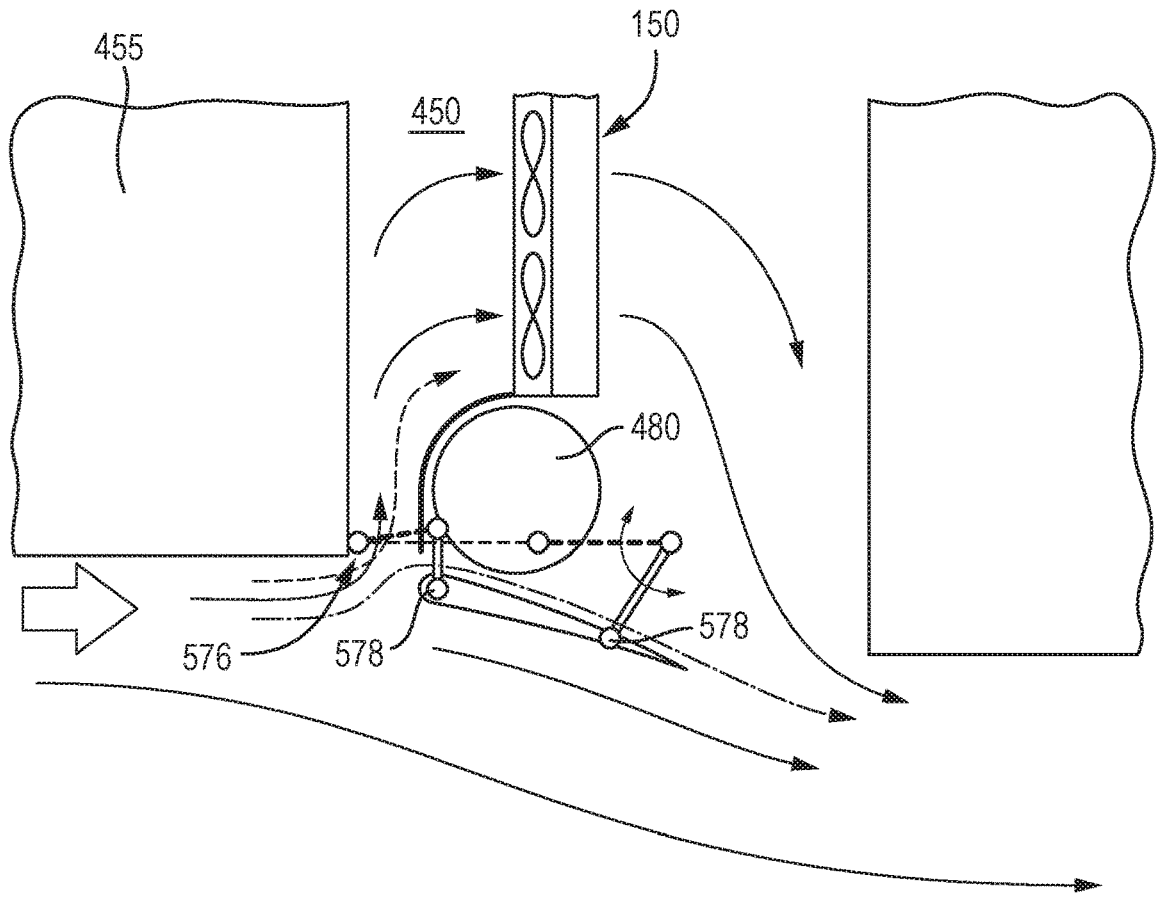

FIG. 10 shows an alternative side intake having a side fender 576 having an inner side wall with a convex shape wing profile (see also FIG. 10B). In FIG. 10A the elongated fender seals the chamber 450 to cabin 455 in closed position. The air collection chamber is provided between a rear end of the cabin 455 and the semi-trailer 435.

In this embodiment; instead of providing an 'open' angle of attack, by controlling the air flow of the travel wind by the side fender 576 having a wing profile; a local under pressure can be created near air accession port 575. Accordingly, in open position, a part of the flow is directed via the convex inward surface to create an under pressure for stimulating air flow bending off around the fairly sharp back end corner of the cabin and entering into the air collection chamber directly behind the cabin. In particular, this is created by a convex inward surface of the wing profile 576 oriented inwards toward the chamber 450. For instance, with such a wing profile, in open position, a front portion of the wing profile opens up the air accession side port 576, and an end portion of the wing profile is urged outwards as shown in FIG. 10B. The wing profile, in particular the fender having the wing profile; is actuated by a linkage mechanism Such a linkage 578 may be mounted with its base at the suspended cabin structure and near the fuel storage 480 or at a separate frame holding such (not shown). In a particular embodiment, the linkage mechanism 578 could comprise a rotating front arm attached to a front end of the elongated fender and a rotating rear arm that is attached to a rear end of the elongated fender, wherein the front arm rotates the front end over a smaller or same distance outward than the rear arm as shown in the Figure. Comparing this solution with the side fender 576 having a wing profile and opening substantially in a direction to the back of the vehicle (as indicated with dx in FIG. 12) with the solution of the active side fender opening at an angle of attack with the travel wind (described by FIG. 9) any of the following advantages can be recognised:

A relatively bigger opening due to a substantially larger longitudinal displacement dx than the lateral displacement dy (which is limited to legal constraints). This feature contributes to allow for more cold travel wind entering into the cowl and air collection chamber.

Furthermore, this mechanism of catching cold travel wind may be boosted by the integrated convex inward surface of the side fender wing profile stimulating air to enter air collection due to generation of under pressure.

Also in opened position of the side fender a good aerodynamic geometry of the tractor semi-trailer remains, effectively contributing to lowering the driving resistance of the vehicle which is important for low energy consumption of the driveline and thus good for total cost of ownership of the vehicle operator.

The aerodynamic forces acting on the side fender in opened position may be much lower. This enables a design of a less heavy construction and application of relatively compact actuator.

The airflow that passes via the convex inward surface of the side fender (see arrow F in FIG. 12) may contribute to better drainage of hot air coming out of the auxiliary radiators that are placed in between the two vertical cylindrical fuel tanks at the back of the cabin and guide along the semi-trail front end which is a considerable blocking obstacle in this sense.

Figure 11:
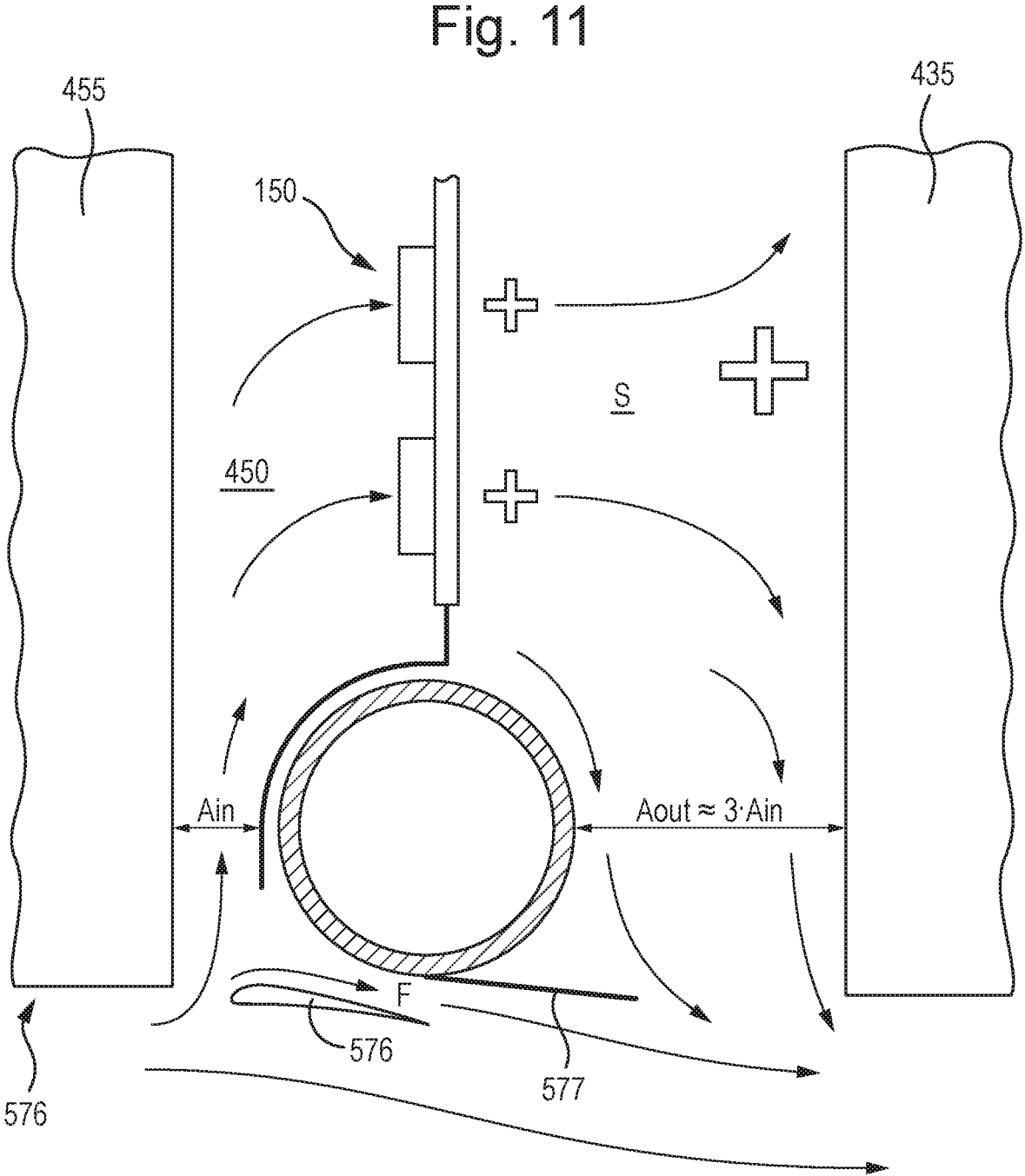
FIG. 11 shows a further enhancement of the schematic layout of FIG. 10.

FIG. 11 shows a further enhancement of the schematic layout of FIG. 10. In top view of a movable side fender 576 as described earlier a static side fender 577 is added, preferably mounted on a side of the air collection chamber 570 and creating a blockage for air (re)circulating back in front direction of the vehicle (a risk related to the under pressure generating mechanism of convex shaped wing profile). The static side fender 577 may aid to prevent hot air coming out of the auxiliary radiator being sucked into the opened side fender entrance and consequently being passed through e-fan activated auxiliary radiators to (re)enter the space S between the air collection chamber 450 and the semi-trailer 435. In particular, further static fender 577 is provided positioned substantially parallel downstream to the elongated fender 576 to guide inner airflow F coming from the wing profile 576 along the static fender along the outside of the air chamber thereby preventing travel wind to enter a space S between the behind the air collection chamber and the semi-trailer 435. Similarly warmed air exiting that space portion S is prevented to travel back to the air collection chamber 450 via the outside contours of the vehicle. The static fender is preferably in fixed mechanical connection to the chassis.

Placing this second (static) fender in the elongation path of the first (active) fender may also be important to provide optimal aerodynamic shaping of the tractor semi-trailer combination when being in closed position of the active fender with the objective to minimize aerodynamic drag forces. Static fender 577 can be connected to fuel storage structure 580, e.g. in fixed mechanical connection with the chassis, to guide airflow along semi-trailer and block hot air flow out of radiator back to inlet of chamber 450 (low under pressure!). Note that base of the structure that actuates and guides the active fender between closed and open position can best be mounted to the suspended cabin structure. This yields specific tuning of clearance and air leakage effects of the complete fender system design in order to establish an optimal overall solution in this sense. The air chamber 450 may have a length dimension $A_{in}$ alongside the truck of about a third of the remaining space S $A_{out}$ so that a return flow to outside is favored. Indicative pressure zones may be −150 Pa at the entrance; −450 to −150 Pa in the air chamber 450 and zero to +300 Pa in the exit space S; allowing an amount air sucked in in passive mode (at a vehicle speed of 20-30 m/s) for about 3-10 m³/s at openings at 0.1-0.2 m² air passage; indicatively, at an air speed through the heat exchanger of about 10-15 m/s. In addition heat exchanger 150 may have a heat exchanging surface provided with electrical mechanical driven ventilators or fans. The flow rates will be substantially higher with fans operating in the air collection chamber, where a delta pressure of about 600 Pa can be easily attained over the heat exchanger.

Figure 12:
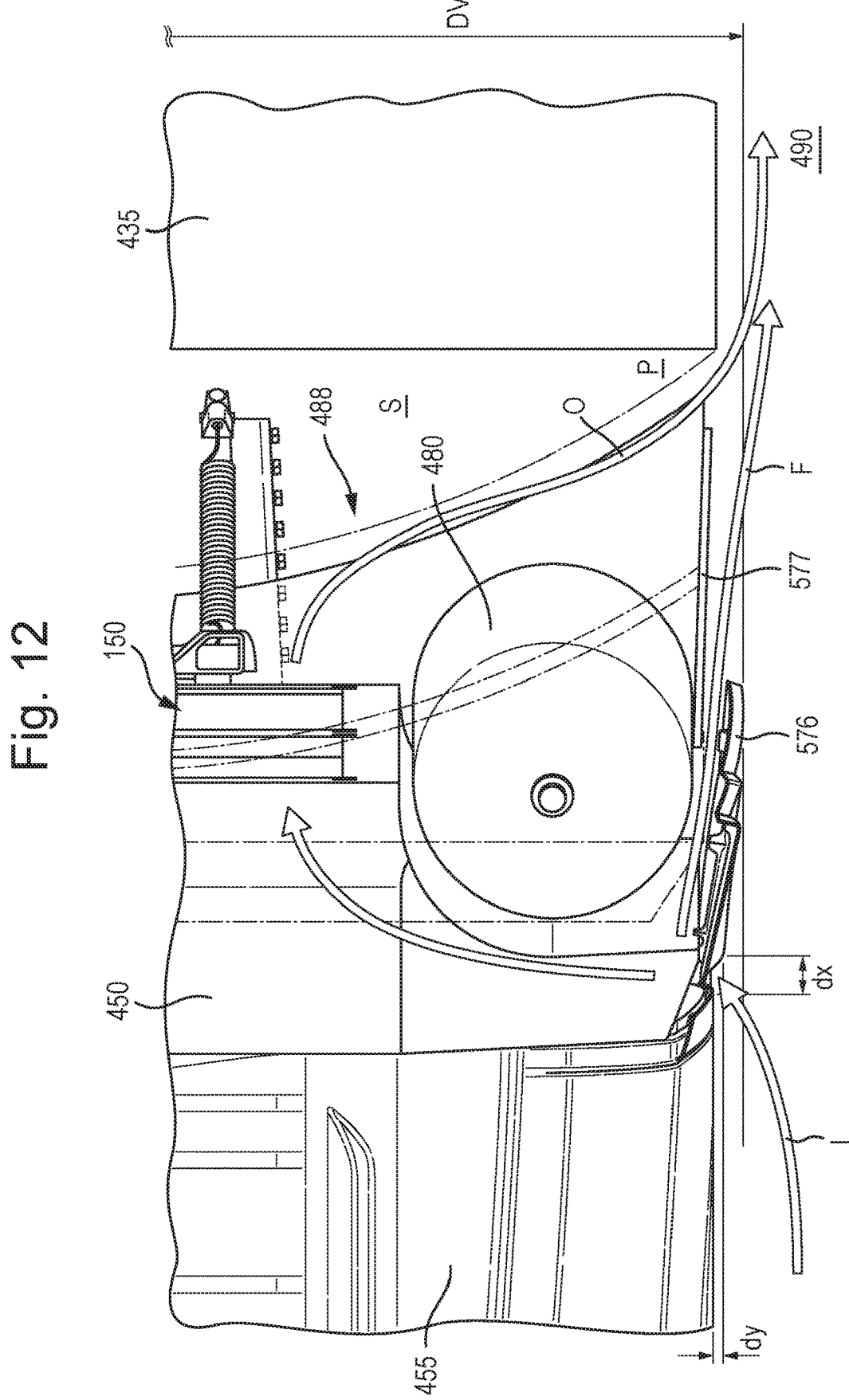
FIG. 12 shows a perspective top view of the movable side fender

FIG. 12 shows a perspective top view of the movable side fender 576 showing preferential air flow I entering the collection chamber 450 provided behind cabin 455 and exiting flow O from space S. Space S is bounded by the semi-trailer 435 on one side, and by construction elements (such as cylindrical tanks, brackets, etc) of the fuel storage 480, so that exiting flow is guided via heat exchanger 150 to space S and alongside the fuel storage related construction elements towards a small exit path formed between the static fender 577 and semi-trailer 435, where it meets the flow F that creates a venturi effect near the exit path P. For the sake of clarity and illustration of packaging and design complexity of the total setup also a virtual perimeter 488 of a clearance zone S of the semi-trailer is drawn in FIG. 12. The construction parts are to be positioned outside this clearance zone S (defined by an outer corner of the semi-trailer front end) to allow for collision free low speed manoeuvring of the tractor semi-trailer combination with large relative yaw and pitch rotations around the fifth wheel.

Furthermore it can be seen that, while the wing profile 576 is urged outwards on it's rear side, the lateral extension is limited within the legally maximum allowed width DV. As alternative for the actuation system by means of a linkage mechanism also a curved rails system may be a applied.

Figure 13:
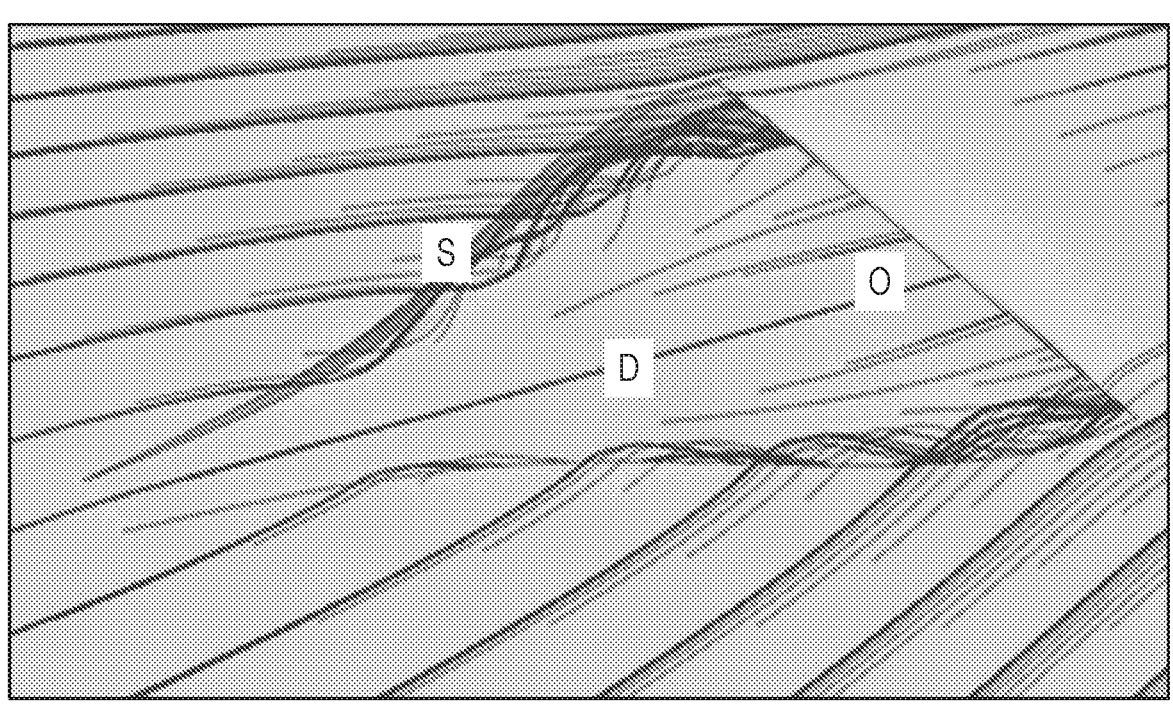
FIG. 13 shows an alternative side intake in the form of NACA ducts.

FIG. 13 shows an alternative side intake in the form of NACA ducts, that could be formed as passive ducts D over a length of the air accession ports disclosed in FIG. 4. Such ducts, known per see, have a property of taking in laminar air flows, which curl inside from the entry sides S towards the entry opening O. In particular the combination of a gentle ramp angle and a curvature profile of walls inside the duct creates counter-rotating vortices which deflect the boundary layer away from the inlet and draws in the faster moving air, while avoiding the form drag and flow separation that can occur with protruding scoop designs. For maximum effect, the number of ducts should be fairly large to have many entry sides providing this effect.

The passive ducts may D be covered by an air transparent cover.

It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . ." should be read as: "component configured for . . ." or "member constructed to . . . " and should be construed to include equivalents for the structures disclosed. The use of expressions like: "critical", "preferred", "especially preferred" etc. is not intended to limit the invention. To the extent that structure, material, or acts are considered to be essential they are inexpressively indicated as such. Additions, deletions, and modifications within the purview of the skilled person may generally be made without departing from the scope of the invention, as determined by the claims.

The invention claimed is:

1. A truck or tractor semi-trailer combination interconnected via a fifth wheel, comprising a cabin and an air collection chamber, the air collection chamber provided between a rear end of the cabin and the semi-trailer and having a front wall substantially adjacent or identical to a cabin rear wall, and a rear wall distanced from the front wall, which air collection chamber is provided with an air accession structure and a heat exchanger, the air accession structure providing air access to the air collection chamber and towards the heat exchanger, said heat exchanger provided in the rear wall of the air collection chamber extending at least partly over a width of the truck; wherein said air accession structure comprises air accession side ports provided on the side walls of the air collection chamber designed to provide at least a passive air flow from the air accession side ports towards the heat exchanger.

2. The truck or tractor semi-trailer combination according to claim 1, wherein the air accession side ports comprise elongated fenders that are actuatable from a closed position, sealing the air collection chamber, to an open position wherein the fender is opened to define an angle of attack relative to the travel wind passing by the cabin.

3. The truck or tractor semi-trailer combination according to claim 1, wherein the air accession side ports comprise elongated fenders having a wing profile, wherein in open position, a front portion of the wing profile opens up the air accession side port, and wherein an end portion of the wing profile is urged outwards.

4. The truck or tractor semi-trailer combination according to claim 3, wherein, in open position the elongated fender is tilted outwards over a lateral distance limited to 8 cm.

5. The truck or tractor semi-trailer combination according to claim 3, wherein the wing profile has a convex inward surface oriented inwards, and wherein the wing profile, in open position, directs a part of the flow via the convex inward surface to create an under pressure for providing air flow entering into the air collection chamber.

6. The truck or tractor semi-trailer combination according to claim 3, wherein a further static fender is provided that is positioned substantially parallel downstream to the elongated fender to guide an inner airflow coming from the wing profile along the static fender along the outside of the air chamber thereby preventing travel wind to enter a portion between the behind of the air collection chamber and the semi-trailer.

7. The truck or tractor semi-trailer combination according to claim 6, wherein the static fender is in fixed mechanical connection to the chassis.

8. The truck or tractor semi-trailer combination according to claim 3, wherein the elongated fender is actuated by a linkage mechanism.

9. The truck or tractor semi-trailer combination according to claim 8, wherein the linkage mechanism comprising a rotating front arm attached to a front end of the elongated fender and a rotating rear arm that is attached to a rear end of the elongated fender, wherein the front arm rotates the front end over a smaller or same distance outward than the rear arm.

10. The truck or tractor semi-trailer combination according to claim 3, wherein the elongated fender is shaped to seal the chamber in closed position.

11. The truck or tractor semi-trailer combination according to claim 3, wherein the elongated fender is supported by the truck cabin.

12. The truck or tractor semi-trailer combination according to claim 1, wherein the heat exchanger is provided central to upstanding fuel tanks arranged on the sides of the air collection chamber and partly defining a perimeter of the air collection chamber, and wherein an air guiding structure is provided in the air chamber to guide the air incoming from the air accession side ports along the perimeter towards the heat exchanger.

13. The truck or tractor semi-trailer combination according to claim 12, wherein the fuel tanks are oriented with a forward inclination, thereby enlarging a lower gap width of the accession side ports.

14. The truck or tractor semi-trailer combination according to claim 1, wherein the air accession side ports are designed as an array of one or more passive ducts.

15. The truck or tractor semi-trailer combination according to claim 14, wherein passive ducts are covered by an air transparent cover.

16. The truck or tractor semi-trailer combination according to claim 14, wherein the passive ducts are NACA ducts.

17. The truck or tractor semi-trailer combination according to claim 1, wherein the heat exchanger has a heat exchanging surface provided with electrical mechanical driven ventilators.

18. The truck or tractor semi-trailer combination according to claim 1, wherein the heat exchange surface ranges between 0.7 and 2.5 m$^2$.

19. The truck or tractor semi-trailer combination according to claim 1, wherein the sum of accession ports to the air collection chamber have a total cross section ranging between 0.18 and 0.6 m$^2$.

20. The truck or tractor semi-trailer combination according to claim 1, wherein the air accession structure further comprises a roof channel located at the top of the cabin and extending substantially towards the front of the cabin.

\* \* \* \* \*